United States Patent
Kashiwagi et al.

(10) Patent No.: US 6,764,067 B2
(45) Date of Patent: Jul. 20, 2004

(54) DUSTPROOF DEVICE FOR LINEAR GUIDE RAIL

(75) Inventors: Shizuo Kashiwagi, Bloomingdale, IL (US); Ryoichi Sato, Maebashi (JP); Yasuyuki Yamazaki, Hanyu (JP)

(73) Assignee: NSK Ltd., Tokyo (JP)

(*) Notice: Subject to any disclaimer, the term of this patent is extended or adjusted under 35 U.S.C. 154(b) by 0 days.

(21) Appl. No.: 10/231,464

(22) Filed: Aug. 30, 2002

(65) Prior Publication Data

US 2004/0041325 A1 Mar. 4, 2004

(51) Int. Cl.⁷ .................................................. B23Q 1/25
(52) U.S. Cl. ...................................................... 269/73
(58) Field of Search .......................... 198/494; 384/15; 269/73, 285

(56) References Cited

U.S. PATENT DOCUMENTS 6,241,230 B1 * 6/2001 Kawaguchi .................. 269/73
6,571,932 B1 * 6/2003 Kawashima et al. ........ 198/494

* cited by examiner

Primary Examiner—Robert C. Watson
(74) Attorney, Agent, or Firm—Crowell & Moring LLP (57) ABSTRACT

To provide a dustproof device for a linear guide rail capable of protecting bolt holes in the linear guide rail from foreign matters such as cutting dust or the like without many tap holes formed in an end face of the linear guide rail. A tension applying means 5 for applying a tension to a band-like cover body 4 includes a tension applying block 13 arranged at an end of a linear guide rail 2, a plurality of pressing plates 14 for pressing the band-like cover body 4 on an upper face of the tension applying block 13, and a pressing plate fixing bolt 15 for fixing the pressing plates 14 on the tension applying block 13. A pair of right and left arm portions 17 each having an engagement convex portion 18 engaging with a rolling element rolling groove 12 in the linear guide rail 2 are provided on the tension applying block 13.

13 Claims, 10 Drawing Sheets

DUSTPROOF DEVICE FOR LINEAR GUIDE RAIL

BACKGROUND OF THE INVENTION

1. Field of the Invention

The present invention relates to a dustproof device for a linear guide rail, which is used to protect bolt holes formed in a linear guide rail for a linear guide bearing apparatus from foreign matters such as cutting dust or the like.

2. Description of the Related Art

Generally, a linear guide rail for a linear guide bearing apparatus is formed with a plurality of bolt holes for bolting the linear guide rail. In the case where the linear guide rail is installed to, for example, a linear slide portion of a machine tool by using these bolt holes, cutting dust of workpiece or the like intrudes into and accumulates in the bolt hole in the linear guide rail, so that when a slider of the linear guide bearing apparatus moves on the linear guide rail, the cutting dust accumulating in the bolt hole intrudes into the slider, which remarkably decreases a life of the linear guide bearing apparatus. Therefore, in order to prevent such a deficiency, a dustproof device 1 shown in FIG. 16 which protects bolt holes 3 in a linear guide rail 2 from foreign matters such as cutting dust has been disclosed in Japanese Patent Laid-Open No. 8-219152.

Figure 16:
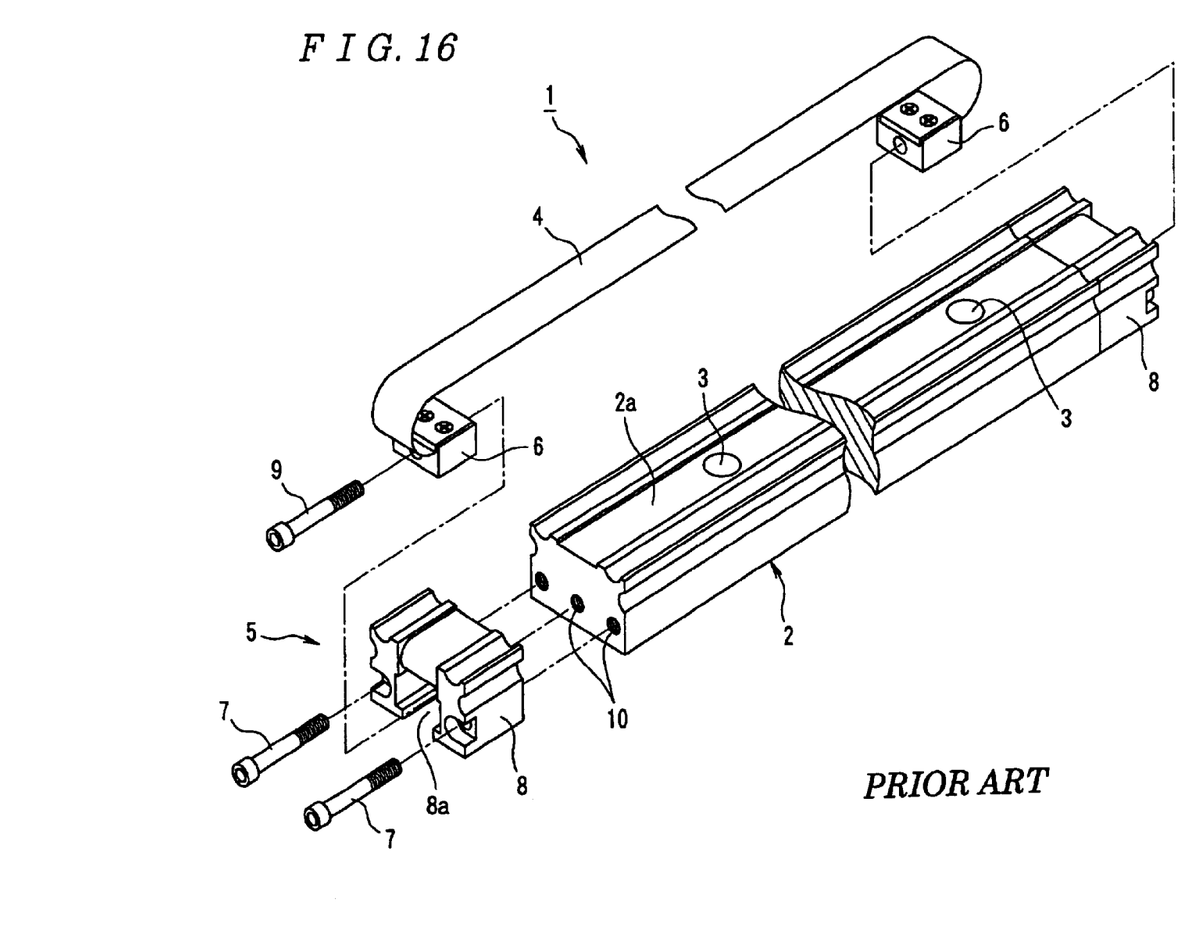
FIG. 16 is a perspective view of a conventional dustproof device for linear guide rail.

The dustproof device 1 shown in FIG. 16 includes a band-like cover body 4 covering a guide rail face 2a including the bolt holes 3 and tension applying means 5 for applying a tension in a lengthwise direction of the linear guide rail 2 to the band-like cover body 4. The band-like cover body 4 is formed of, for example, a hardened stainless steel sheet (thickness: about 0.15 to 0.3 mm).

The tension applying means 5 is provided with a pair of moving pieces 6, and each of the moving piece 6 is connected with one end portion of the band-like cover body 4. Also, the tension applying means 5 is provided with a pair of cover fixing members 8 each fixed to the end face of the linear guide rail 2 by means of a plurality of bolts 7, so that when the moving piece 6 fitted in a hollow portion 8a of the cover fixing member 8 is tightened to both end faces of the linear guide rail 2 by a bolt 9, a tension is applied to the band-like cover body 4.

In the above-described dustproof device 1, since the guide rail face 2a including the bolt holes 3 is covered by the band-like cover body 4, foreign matters such as cutting dust can be prevented from intruding into and accumulating in the bolt holes 3. However, many tap holes (threaded holes) 10 must be formed in an end face of the linear guide rail 2, which presents a problem of troublesome work for forming the tap holes 10.

Also, the configuration is such that the moving piece 6 fitted in the hollow portion 8a of the cover fixing member 8 is pulled toward the end face of the linear guide rail 2 by the tightening force of the bolt 9 to apply a tension to the band-like cover body 4. Therefore, the cover fixing member 8 is relatively long. As a result, there arises a problem in that a length of the whole of the linear guide rail including the dustproof device 1 increases.

Furthermore, there arises a problem in that a space for adjusting the tension of the band-like cover body 4 by operating the bolt 9 is needed on both end sides of the linear guide rail 2.

SUMMARY OF THE INVENTION

The present invention has been achieved to solve the above problems, and accordingly an object thereof is to provide a dustproof device for linear guide rail capable of protecting bolt holes in a linear guide rail from foreign matters such as cutting dust or the like without many tap holes formed in the end face of the linear guide rail.

To attain the above object, a first aspect of the present invention provides a dustproof device for linear guide rail, including a band-like cover body covering a guide rail face including bolt holes for bolting a linear guide rail having a concave portion such as a rolling element rolling groove on the side faces thereof and tension applying means for applying a tension in the lengthwise direction of the linear guide rail to the band-like cover body, wherein the tension applying means includes a tension applying block arranged at the end of the linear guide rail, a plurality of pressing plates for pressing the band-like cover body on the upper face of the tension applying block, and a pressing plate fixing bolt for fixing the pressing plates on the upper face of the tension applying block; and a pair of right and left arm portions are provided on the tension applying block, and an engagement convex portion which engages with the concave portion is provided on the opposed inside faces of the arm portions.

Also, a second aspect of the present invention provides a dustproof device for linear guide rail, including a band-like cover body covering a guide rail face including bolt holes for bolting a linear guide rail and tension applying means for applying a tension in the lengthwise direction of the linear guide rail to the band-like cover body, wherein the tension applying means includes a tension applying block arranged at the end of the linear guide rail, a plurality of pressing plates for pressing the band-like cover body on the upper face of the tension applying block, and a pressing plate fixing bolt for fixing the pressing plates on the upper face of the tension applying block; and a pair of right and left arm portions which press the linear guide rail from both sides are provided on the tension applying block.

Also, a third aspect of the present invention provides a dustproof device for linear guide rail, including a band-like cover body covering a guide rail face including bolt holes for bolting a linear guide rail on a rail attachment surface and tension applying means for applying a tension in the lengthwise direction of the linear guide rail to the band-like cover body, wherein the tension applying means includes a tension applying member arranged at the end of the linear guide rail, a plurality of pressing plates for pressing the band-like cover body on the tension applying member, a pressing plate fixing bolt for fixing the pressing plates on the tension applying member, and a plurality of tension applying member fixing bolts for fixing the tension applying member on the rail attachment surface.

In the dustproof device for linear guide rail in accordance of the first aspect of the present invention, when the engagement convex portion of the arm portion provided on the tension applying block engages with the concave portion such as a rolling element rolling groove in the linear guide rail, the tension applying block becomes in a state in which the vertical movement thereof is restrained. Thereby, even if the tension applying block is not fixed to the end face of the linear guide rail by bolts, a tension can be applied to the band-like cover body. Therefore, the bolt holes in the linear guide rail can be protected from foreign matters such as cutting dust without many tap holes formed in the end face of the linear guide rail.

It is preferable that the tension applying block have an upper step portion adjoining the linear guide rail and a lower step portion formed continuously with the rear end of the upper step portion, and the pressing plates be fixed on the upper face of the lower step portion in a state of being laminated. By this configuration, the slack of the band-like cover body can be adjusted and absorbed by utilizing a riser formed between the upper step portion and the lower step portion of the tension applying block. Also, a face on which the pressing plates of the tension applying block is fixed is preferably lower than a face with which the band-like cover body of the linear guide rail comes into contact.

Also, the tension applying block preferably has a concave positioning portion for positioning the band-like cover body in the center on the upper face of the tension applying block. By this configuration, the guide rail face including bolt holes can surely be covered by the band-like cover body.

Further, it is preferable that the pressing plate have a through hole for causing a threaded portion of the pressing plate fixing bolt to pass through, and the through hole be formed into an elongated shape along the lengthwise direction of the band-like cover body.

In the second aspect of the present invention, the tension applying member is made in a state in which the vertical movement thereof is restrained by the paired arm portions provided on the tension applying member, and a tension can be applied to the band-like cover body even if the tension applying block is not fixed to the end face of the linear guide rail by bolts. Therefore, the bolt holes in the linear guide rail can be protected from foreign matters such as cutting dust without many tap holes formed in the end face of the linear guide rail.

In the third aspect of the present invention, the tension applying member is made in a state in which the vertical movement thereof is restrained by the tension applying member fixed on the rail attachment surface by the tension applying member fixing bolts, and a tension can be applied to the band-like cover body even if the tension applying member is not fixed to the end face of the linear guide rail by bolts. Therefore, the bolt holes in the linear guide rail can be protected from foreign matters such as cutting dust without many tap holes formed in the end face of the linear guide rail.

BRIEF DESCRIPTION OF THE DRAWINGS

FIG. 4 is a sectional view showing a first embodiment of the present invention, FIG. 4A showing a state before a tension is applied to a band-like cover body, and FIG. 4B showing a state after a tension has been applied to the band-like cover body;

FIG. 6 is a sectional view showing the second embodiment of the present invention, FIG. 6A showing a state in which pressing plates are lapped and fixed on a tension applying block, and FIG. 6B showing a state in which pressing plates are fixed on a tension applying block in a state of being shifted in a lengthwise direction of a band-like cover body;

DETAILED DESCRIPTION OF THE PREFERRED EMBODIMENTS

Embodiments of the present invention will now be described with reference to the accompanying drawings.

Figure 1:
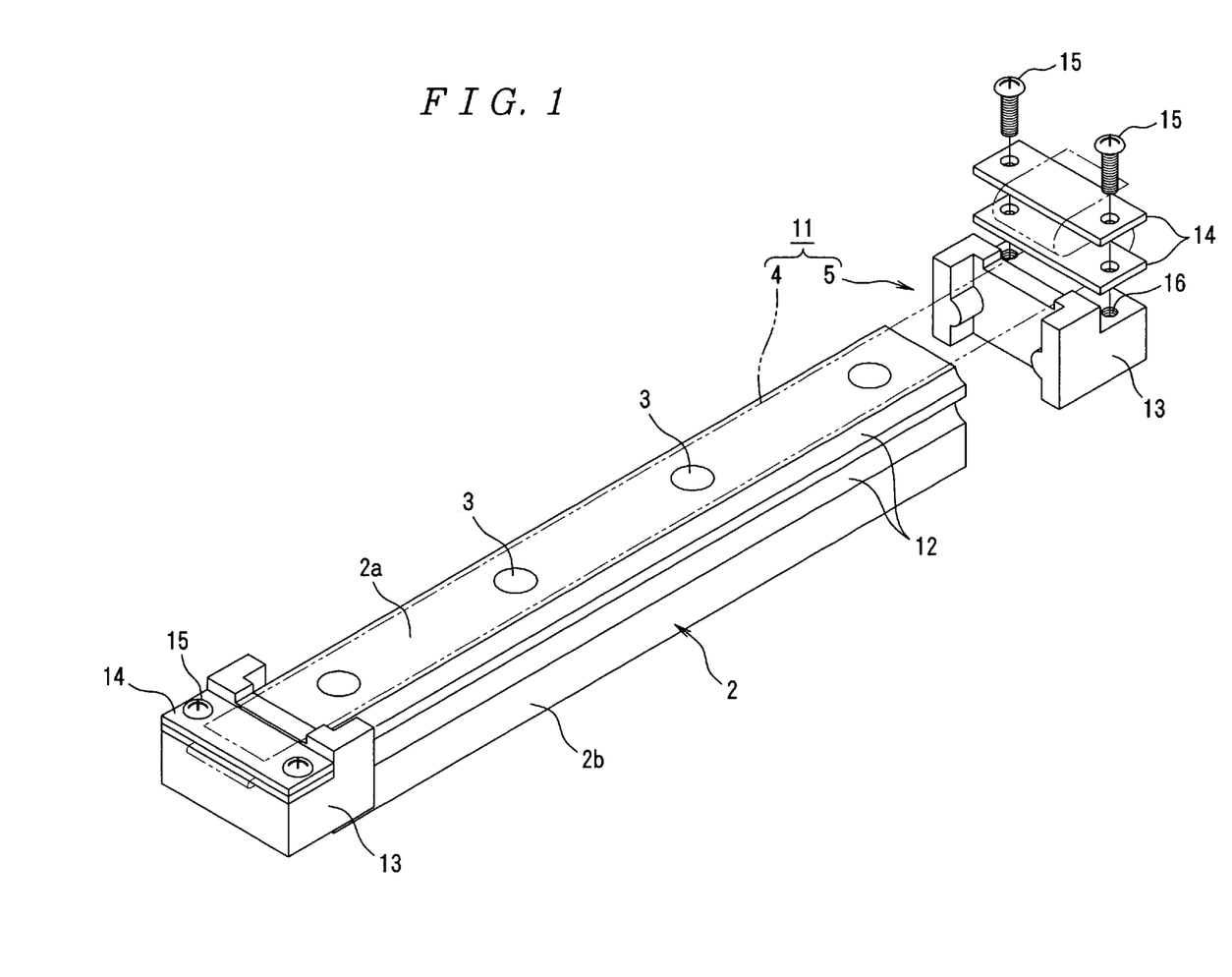
FIG. 1 is a perspective view showing a first embodiment of the present invention.

FIGS. 1 to 4 show a first embodiment of the present invention. In FIG. 1, reference numeral 11 denotes a dustproof device for linear guide rail in accordance with the first embodiment of the present invention. This dustproof device 11 for linear guide rail includes a band-like cover body 4 covering a guide rail face 2a including bolt holes 3 and tension applying means 5 for applying a tension in the lengthwise direction of a linear guide rail 2 to the band-like cover body 4. At each side 2b of the linear guide rail 2, two rows of rolling element rolling grooves 12 are provided in the lengthwise direction of the linear guide rail 2.

The tension applying means 5 includes a pair of tension applying blocks 13 arranged so as to be opposed to each other at both ends of the linear guide rail 2, a plurality of (for example, four) pressing plates 14 for pressing the band-like cover body 4 on the upper face of the tension applying block 13, and a plurality of (for example, four) pressing plate fixing bolts 15 for fixing the pressing plates 14 on the upper face of the tension applying block 13. In the upper face of the tension applying block 13, a plurality of (for example, two) threaded holes 16 which threadedly engage with the threaded portion of the pressing plate fixing bolt 15 are formed.

Figure 2:
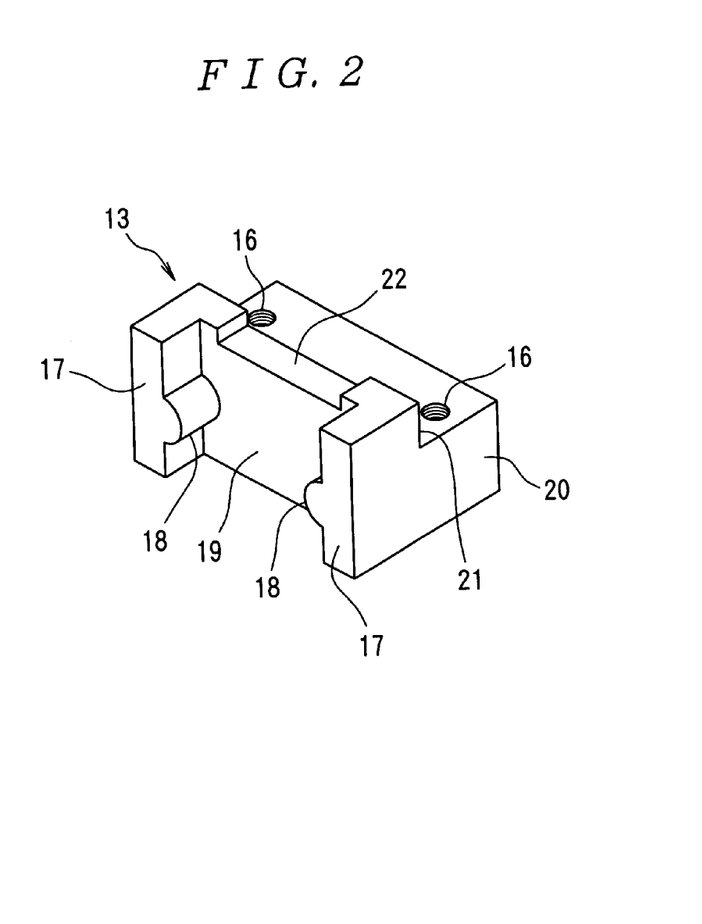
FIG. 2 is a perspective view of a tension applying block shown in FIG. 1.
Figure 3:
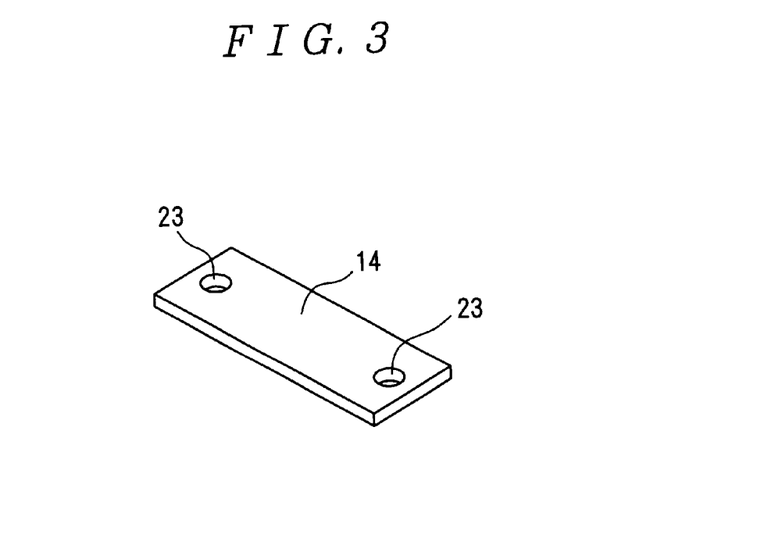
FIG. 3 is a perspective view of a pressing plate shown in FIG. 1.

As shown in FIG. 2, the tension applying block 13 has a pair of right and left block-shaped arm portions 17. On the opposed inside faces of the block-shaped arm portions 17, an engagement convex portion 18 which engages with the lower rolling element rolling groove 12 is provided. The tension applying block 13 also has an upper step portion 19 adjoining the linear guide rail 2 and a lower step portion 20 formed continuously with the rear end of the upper step portion 19. Between the upper step portion 19 and the lower step portion 20 is formed a riser 21. The tension applying block further has a concave positioning portion 22 for positioning the band-like cover body 4 in the center on the upper face of the tension applying block 13. This positioning portion 22 is provided on the upper face of the upper step portion 19.

Figure 4A:
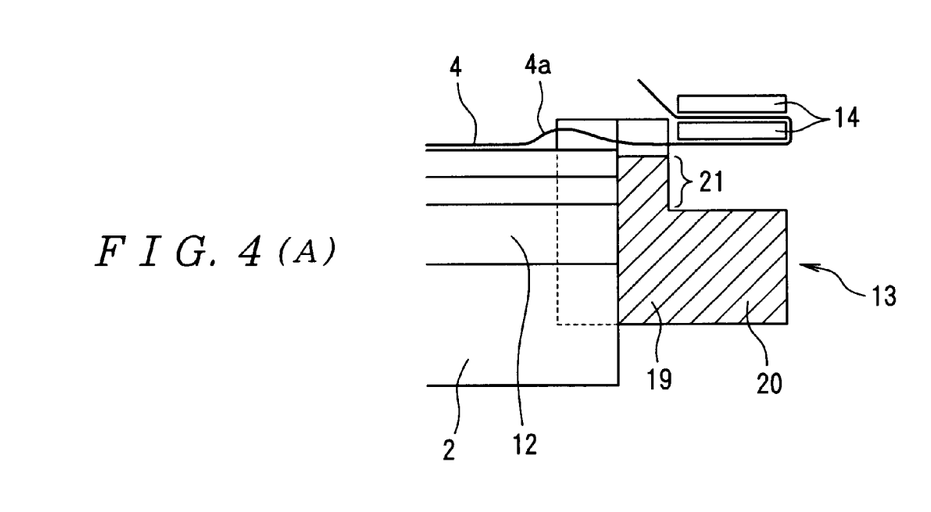
Figure 4B:
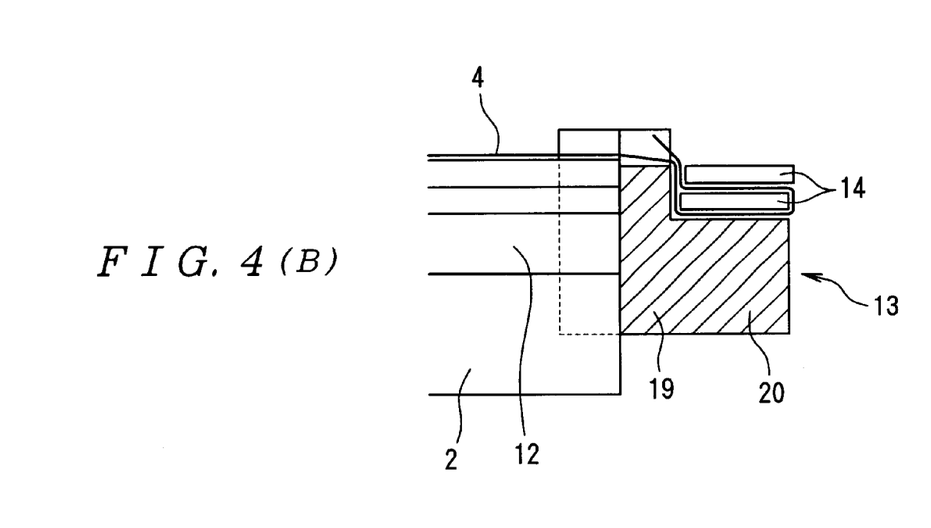

The pressing plate 14 is formed into a rectangular shape, and is formed with a plurality of (for example, two) through holes 23 (see FIG. 3) for causing the pressing plate fixing bolt 15 to pass through. The pressing plates 14 are fixed on the lower step portion 20 of the tension applying block 13 in a state of being lapped on each other as shown in FIG. 4.

In the dustproof device 11 for linear guide rail constructed as described above, when the engagement convex portion 18 of the block-shaped arm portion 17 provided on the tension applying block 13 engages with the lower rolling element rolling groove 12 in the linear guide rail 2, the tension applying block 13 becomes in a state in which the vertical movement thereof is restrained. Thereby, even if the tension applying block 13 is not fixed to the end face of the linear guide rail 2 by bolts, a tension can be applied to the band-like cover body 4. Therefore, the bolt holes 3 in the linear guide rail 2 can be protected from foreign matters such as cutting dust without many tap holes formed in the end face of the linear guide rail 2.

Also, in the above-described embodiment, the slack of the band-like cover body 4 can be adjusted and absorbed by utilizing the riser 21 formed between the upper step portion 19 and the lower step portion 20 of the tension applying block 13, so that a tension in the lengthwise direction of the linear guide rail 2 can surely be applied to the band-like cover body 4. Further, since the concave positioning portion 22 for positioning the band-like cover body 4 in the center of the tension applying block 13 is provided on the tension applying block 13, the guide rail face 2a including the bolt holes 3 can surely be covered by the band-like cover body 4.

Also, since the configuration is such that the band-like cover body 4 is pressed on the upper face of the tension applying block 13 by using the pressing plates 14 to apply a tension to the band-like cover body 4, unlike the conventional example shown in FIG. 16, the band-like cover body 4 needs not to be cut to an appropriate length so as to match the length of the linear guide rail 2. Also, in the conventional example shown in FIG. 16, the moving pieces 6 must be moved in the lengthwise direction of the linear guide rail 2 to apply a tension to the band-like cover body 4. In the above-described embodiment, however, the pressing plates 14 need not to be moved in the lengthwise direction of the linear guide rail 2, so that the length of the whole of the dustproof device can be shortened. Further, although a space for adjusting the tension of the band-like cover body 4 must be provided on both end sides of the linear guide rail 2 in the conventional example shown in FIG. 16, in the above-described embodiment, a space for adjusting the tension of the band-like cover body 4 needs not to be provided on both end sides of the linear guide rail 2 because the band-like cover body 4 is pressed on the upper face of the tension applying block 13 to apply a tension to the band-like cover body 4.

Figure 5:
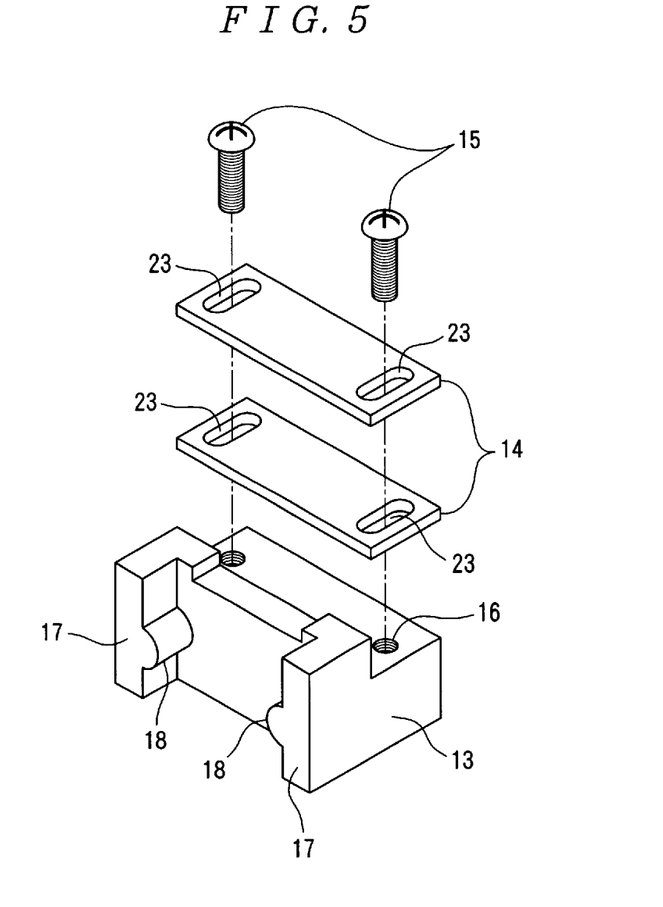
FIG. 5 is a perspective view showing a second embodiment of the present invention.
Figure 6A:
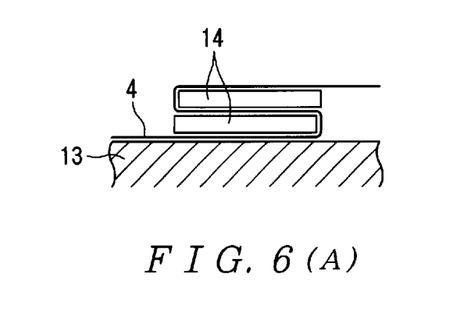
Figure 6B:
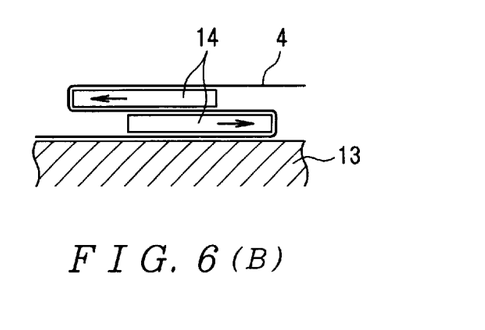

Although the through hole 23 in the pressing plate 14 has a circular shape in the above-described first embodiment, the through hole 23 in the pressing plate 14 may be formed into an elongated shape along the lengthwise direction of the linear guide rail 2 as in a second embodiment shown in FIG. 5. By this configuration, as shown in FIG. 6, the two pressing plates 14 lapped on each other on the tension applying block 13 are slid in the lengthwise direction of the linear guide rail 2, whereby the tension of the band-like cover body 4 can be adjusted easily.

Figure 7:
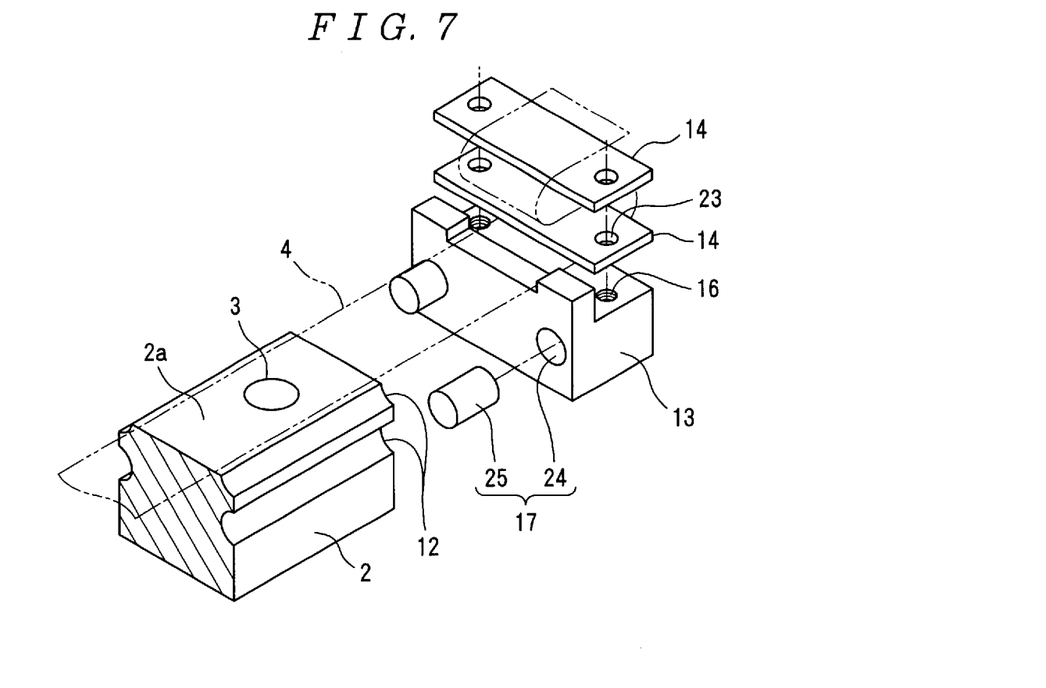
FIG. 7 is a perspective view showing a third embodiment of the present invention.

Also, although the paired right and left block-shaped arm portions 17 are integrally provided on the tension applying block 13 in the first embodiment, as in a third embodiment shown in FIG. 7, the arm portion 17 maybe formed by providing a circular hole 24 in the front end face of the tension applying block 13 and by inserting a columnar member 25 in this circular hole 24.

Figure 8:
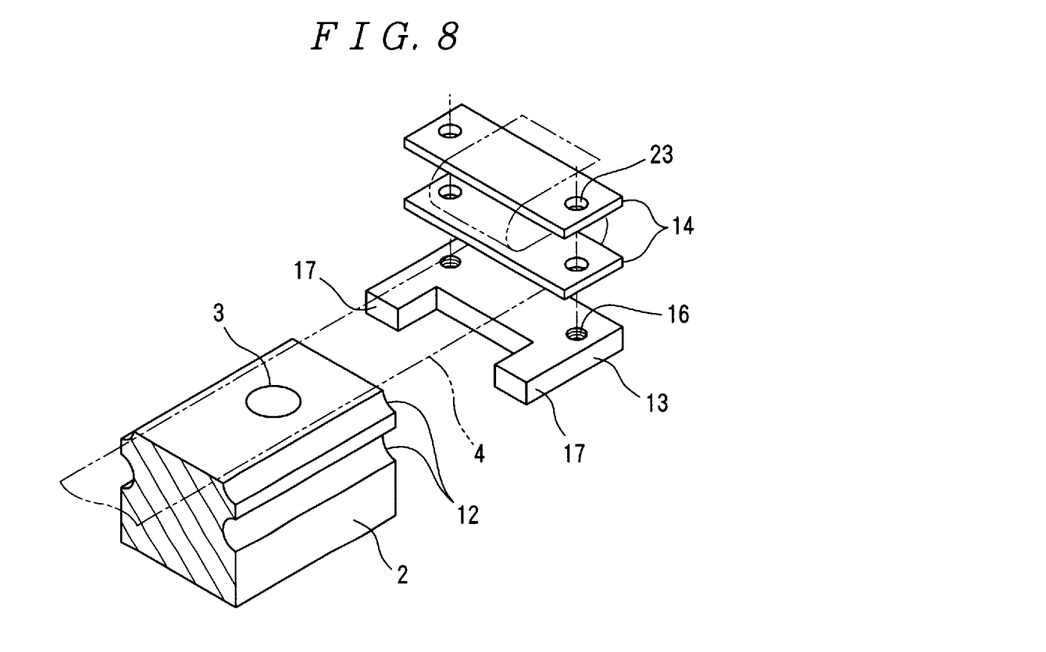
FIG. 8 is a perspective view showing a fourth embodiment of the present invention.
Figure 9:
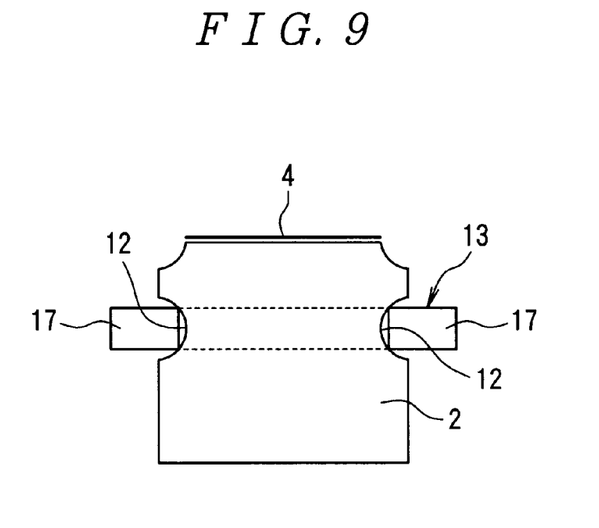
FIG. 9 is a front view showing a fourth embodiment of the present invention.
Figure 10:
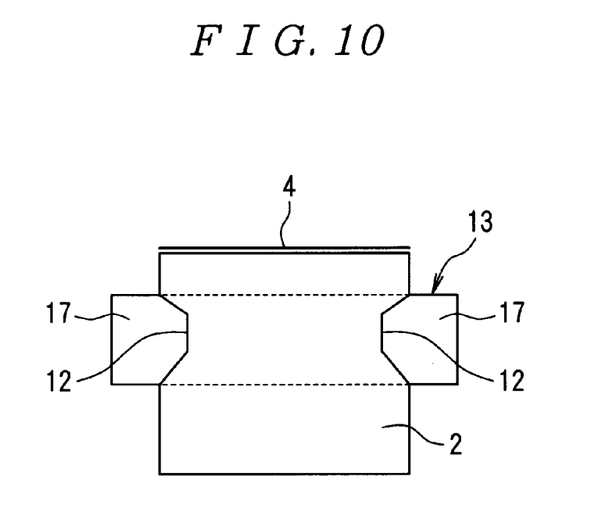
FIG. 10 is a front view showing a fifth embodiment of the present invention.

In the above-described third embodiment, the cross-sectional shape of the arm portion 17 is circular. However, the cross-sectional shape of the arm portion 17 may be rectangular as in a fourth embodiment shown in FIGS. 8 and 9. Also, in the first to fourth embodiments, the cross-sectional shape of the arm portion 17 is circular or rectangular because the cross-section of the rolling element rolling groove 12 is formed into a Gothic arch shape. However, when the cross-sectional shape of the rolling element rolling groove 12 has upper and lower flat-shaped roller rolling faces, for example, as in a fifth embodiment shown in FIG. 10, the arm portion 17 may have a cross-sectional shape of a concave groove including upper and lower roller rolling faces.

Figure 11:
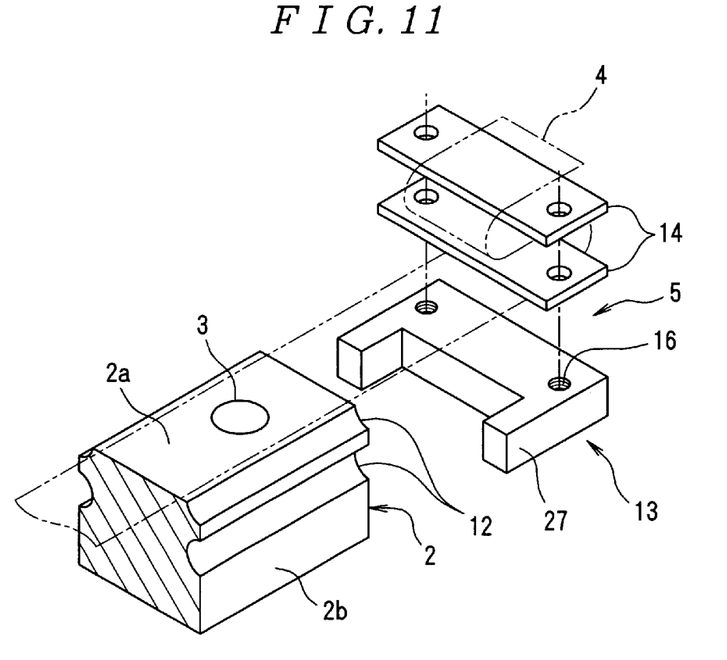
FIG. 11 is a perspective view showing a sixth embodiment of the present invention.
Figure 12:
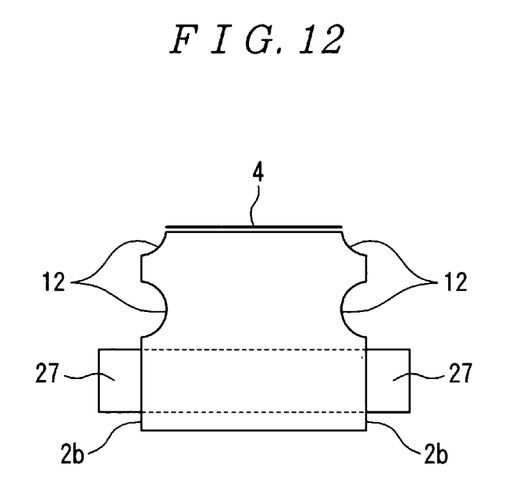
FIG. 12 is a front view showing a sixth embodiment of the present invention.
Figure 13:
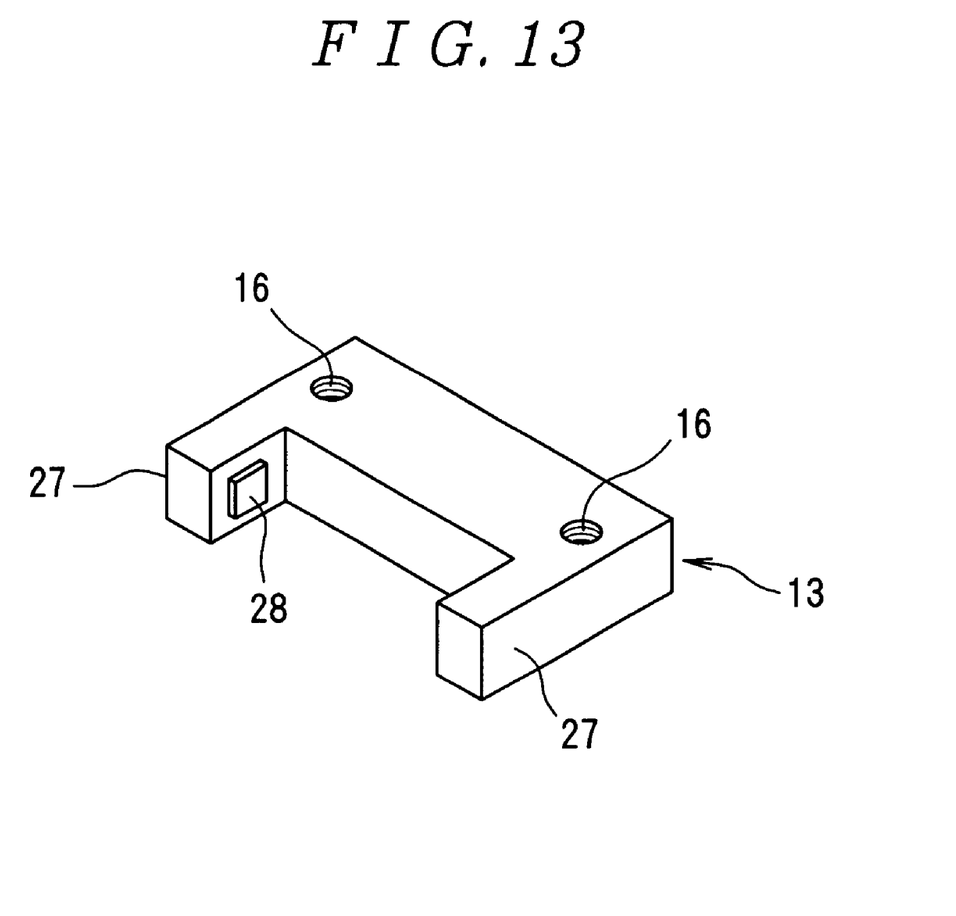
FIG. 13 is a perspective view of a tension applying block shown in FIG. 11.

Next, a sixth embodiment of the present invention will be described with reference to FIGS. 11 to 13. In FIG. 11, a dustproof device for linear guide rail in accordance with the sixth embodiment of the present invention includes a band-like cover body 4 covering a guide rail face 2a including bolt holes 3 and tension applying means 5 for applying a tension in the lengthwise direction of a linear guide rail 2 to the band-like cover body 4. At each side 2b of the linear guide rail 2, two rows of rolling element rolling grooves 12 are provided in the lengthwise direction of the linear guide rail 2.

The tension applying means 5 includes a pair of tension applying blocks 13 arranged so as to be opposed to each other at both ends of the linear guide rail 2, a plurality of (for example, four) pressing plates 14 for pressing the band-like cover body 4 on the upper face of the tension applying block 13, and a plurality of (for example, four) pressing plate fixing bolts for fixing the pressing plates 14 on the upper face of the tension applying block 13. In the upper face of the tension applying block 13, a plurality of (for example, two) threaded holes 16 which threadedly engage with the threaded portion of the pressing plate fixing bolt are formed.

The tension applying block 13 has a pair of right and left arm portions 27 which press the linear guide rail 2 from both sides. On the opposed inside faces of the arm portions 27, a protrusion 28 (see FIG. 13) which engages with the side face 2b of the linear guide rail 2 is provided.

In the dustproof device for linear guide rail constructed as described above, when the linear guide rail 2 is pressed from both sides by the arm portions 27 provided on the tension applying block 13, the tension applying block 13 becomes in a state in which the vertical movement thereof is restrained. In this case, if the tension applying block 13 has a greater thickness as shown in FIG. 12, the tilt of the tension applying block 13 is effectively prevented. Thereby, even if the tension applying block 13 is not fixed to the end face of the linear guide rail 2 by bolts, a tension can be applied to the band-like cover body 4. Therefore, the bolt holes 3 in the linear guide rail 2 can be protected from foreign matters such as cutting dust without tap holes formed in the end face of the linear guide rail 2.

Figure 14:
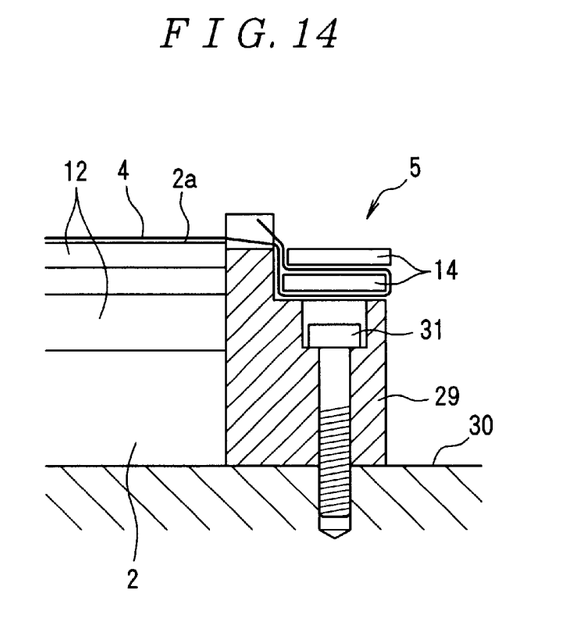
FIG. 14 is a sectional view showing a seventh embodiment of the present invention.

Next, a seventh embodiment of the present invention will be described with reference to FIG. 14. In FIG. 14, a dustproof device for linear guide rail in accordance with the seventh embodiment of the present invention includes a band-like cover body 4 covering a guide rail face 2a including bolt holes and tension applying means 5 for applying a tension in the lengthwise direction of a linear guide rail 2 to the band-like cover body 4. At each side of the linear guide rail 2, two rows of rolling element rolling grooves 12 are provided in the lengthwise direction of the linear guide rail 2.

The tension applying means 5 includes a pair of tension applying members 29 arranged at both ends of the linear guide rail 2, a plurality of (for example, four) pressing plates 14 for pressing the band-like cover body 4 on the upper face of the tension applying member 29, a plurality of (for example, four) pressing plate fixing bolts for fixing the pressing plates 14 on the upper face of the tension applying member 29, and a plurality of tension applying member fixing bolts 31 for fixing the tension applying member 29 to the rail attachment surface 30.

In the dustproof device for linear guide rail constructed as described above, when the tension applying member 29 is fixed on the rail attachment surface 30 by the tension applying member fixing bolts 31, the tension applying member 29 becomes in a state in which the vertical movement thereof is restrained. Thereby, even if the tension applying member 29 is not fixed to the end face of the linear guide rail 2 by bolts, a tension can be applied to the band-like cover body 4. Therefore, the bolt holes 3 in the linear guide rail 2 can be protected from foreign matters such as cutting dust without tap holes formed in the end face of the linear guide rail 2.

Figure 15:
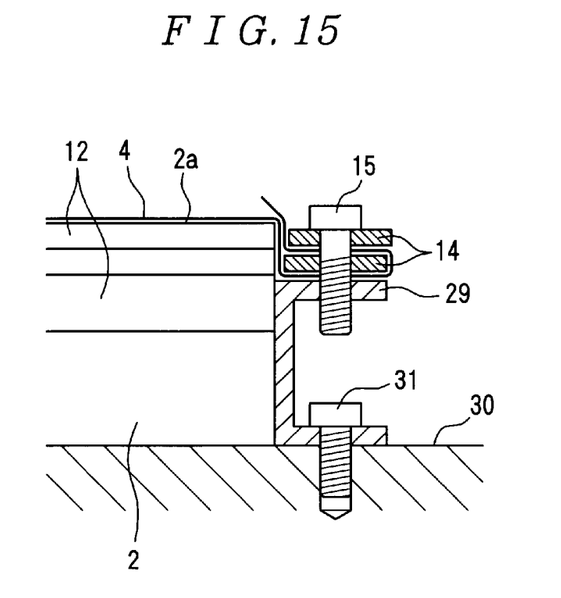
FIG. 15 is a sectional view showing an eighth embodiment of the present invention.

Although the tension applying member 29 arranged at both ends of the linear guide rail 2 is formed into a block shape in the above-described seventh embodiment, as in an eighth embodiment shown in FIG. 15, the tension applying member 29 may be formed by bending a metal plate into a U shape.

In the above-described first to seventh embodiments, an example in which the tension applying means 5 is provided at both ends of the linear guide rail 2 has been shown. However, at one end of the linear guide rail, an end portion of the band-like cover body is fixed to the end of the linear guide rail by screws, and the tension applying means may be provided only at the other end of the linear guide rail. Also, in the above-described embodiments, the case where the rolling element rolling grooves are formed in two rows has been shown as an example. However, the rolling element rolling groove may be provided in one row or in three rows. Further, in the above-described embodiments, the case where the upper rolling element rolling groove of the two rows of rolling element rolling grooves is provided in a portion in which the side face and the upper face of the linear guide rail intersect has been shown as an example. However, when the rolling element rolling grooves are provided at two places separated from the upper face of the linear guide rail, either of the rolling element rolling grooves may be used as an engagement portion with the engagement convex portion. Still further, in the above-described embodiments, an example in which the engagement convex portion of the tension applying means is engaged with a concave portion including the rolling element rolling groove has been shown. However, when there is a groove (concave portion) other than the rolling element rolling groove, the engagement convex portion may be engaged with that concave portion.

As described above, according to the invention as set forth in claims 1, 5 and 6, even if the tension applying block is not fixed to the end face of the linear guide rail by bolts, a tension can be applied to the band-like cover body. Therefore, the bolt holes in the linear guide rail can be protected from foreign matters such as cutting dust without tap holes formed in the end face of the linear guide rail.

According to the invention as set forth in claim 2, in addition to the above-described effect, the slack of the band-like cover body can be adjusted and absorbed by utilizing the riser formed between the upper step portion and the lower step portion of the tension applying block, so that a tension in the lengthwise direction of the linear guide rail can surely be applied to the band-like cover body.

According to the invention as set forth in claim 3, in addition to the above-described effect, the linear guide rail including the bolt holes can surely be covered by the band-like cover body.

According to the invention as set forth in claim 4, in addition to the above-described effect, the tension of the band-like cover body can be adjusted easily by sliding the pressing plates lapped on the tension applying block in the lengthwise direction of the linear guide rail.

What is claimed is:

1. A dustproof device for a linear guide rail, comprising:
a band-like cover body covering a guide rail face including bolt holes for bolting a linear guide rail having a concave portion on side faces thereof; and
tension applying means for applying a tension in a lengthwise direction of said linear guide rail to said band-like cover body,
wherein said tension applying means comprises a tension applying block arranged at the end of said linear guide rail, a plurality of pressing plates for pressing said band-like cover body on the upper face of said tension applying block, and a pressing plate fixing bolt for fixing said pressing plates on the upper face of said tension applying block; and a pair of right and left arm portions are provided on said tension applying block, and an engagement convex portion which engages with said concave portion is provided on the opposed inside faces of said arm portions.

2. The dustproof device for a linear guide rail according to claim 1, wherein said tension applying block has an upper step portion adjoining said linear guide rail and a lower step portion formed continuously with the rear end of said upper step portion, and said pressing plates are fixed on the upper face of said lower step portion in a state of being laminated.

3. The dustproof device for a linear guide rail according to claim 1 or 2, wherein said tension applying block has a concave positioning portion for positioning said band-like cover body in the center on the upper face of said tension applying block.

4. The dustproof device for a linear guide rail according to claim 1 or 2, wherein each of said pressing plates has a through hole for causing a threaded portion of said pressing plate fixing bolt to pass through, and said through hole is formed into an elongated shape along the lengthwise direction of said band-like cover body.

5. A dustproof device for a linear guide rail, comprising:
a band-like cover body covering a guide rail face including bolt holes for bolting a linear guide rail; and
tension applying means for applying a tension in a lengthwise direction of said linear guide rail to said band-like cover body,
wherein said tension applying means comprises a tension applying block arranged at the end of said linear guide rail, a plurality of pressing plates for pressing said band-like cover body on the upper face of said tension applying block, and a pressing plate fixing bolt for fixing said pressing plates on the upper face of said tension applying block; and a pair of right and left arm portions which press said linear guide rail from both sides are provided on said tension applying block.

6. A dustproof device for a linear guide rail, comprising:
a band-like cover body covering a guide rail face including bolt holes for bolting a linear guide rail on a rail attachment surface; and tension applying means for applying a tension in a lengthwise direction of said linear guide rail to said band-like cover body, wherein said tension applying means comprises a tension applying member arranged at the end of said linear guide rail, a plurality of pressing plates for pressing said band-like cover body on said tension applying member, a pressing plate fixing bolt for fixing said pressing plates on said tension applying member, and a plurality of tension applying member fixing bolts for fixing said tension applying member on said rail attachment surface.

7. The dustproof device for a linear guide rail according to claim 1, wherein a face on which said pressing plates of said tension applying block is fixed is lower than a face with which said band-like cover body of said linear guide rail comes into contact.

8. In combination a linear guide bearing apparatus and a dustproof device for a linear guide rail according to any one of claim 1, 2, 5, 6, or 7.

9. The dustproof device for a linear guide rail according to claim 3, wherein each of said pressing plates has a through hole for causing a threaded portion of said pressing plate fixing bolt to pass through, and said through hole is formed into an elongated shape along the lengthwise direction of said band-like cover body.

10. In combination a linear guide bearing apparatus and a dustproof device for a linear guide rail according to claim 3.

11. In combination a linear guide bearing apparatus and a dustproof device for a linear guide rail according to claim 4.

12. In combination a linear guide bearing apparatus and a dustproof device for a linear guide rail according to claim 9.

13. The dustproof device for a linear guide rail according to claim 1, 2, 5, 6, or 7, wherein said concave portion is a rolling element rolling groove.

* * * * *